United States Patent
Young et al.

(10) Patent No.: US 12,179,094 B2
(45) Date of Patent: Dec. 31, 2024

(54) VIDEO GAME CONTROLLER WITH SOCIAL NETWORKING

(71) Applicant: Voyetra Turtle Beach Inc., White Plains, NY (US)

(72) Inventors: Andrew Brian Young, Wales (GB); Stephen Thomas Bright, Wales (GB); Daniel Stuart-Cross, Wales (GB)

(73) Assignee: Voyetra Turtle Beach, Inc., White Plains, NY (US)

( * ) Notice: Subject to any disclaimer, the term of this patent is extended or adjusted under 35 U.S.C. 154(b) by 22 days.

(21) Appl. No.: 17/477,344

(22) Filed: Sep. 16, 2021

(65) Prior Publication Data

US 2023/0085260 A1    Mar. 16, 2023

(51) Int. Cl.
| | |
|---|---|
| A63F 13/00 | (2014.01) |
| A63F 13/2145 | (2014.01) |
| A63F 13/23 | (2014.01) |
| A63F 13/26 | (2014.01) |
| A63F 13/87 | (2014.01) |
| G06F 3/0482 | (2013.01) |
| G06F 3/0488 | (2022.01) |
| H04L 67/131 | (2022.01) |

(52) U.S. Cl.
CPC .......... *A63F 13/26* (2014.09); *A63F 13/2145* (2014.09); *A63F 13/23* (2014.09); *A63F 13/87* (2014.09); *G06F 3/0482* (2013.01); *G06F 3/0488* (2013.01); *H04L 67/131* (2022.05); A63F 2300/1025 (2013.01); A63F 2300/1075 (2013.01); A63F 2300/301 (2013.01); A63F 2300/572 (2013.01)

(58) Field of Classification Search
CPC .. A63F 2300/572; A63F 13/79; A63F 13/335; A63F 13/87
See application file for complete search history.

(56) References Cited

U.S. PATENT DOCUMENTS

| | | | | |
|---|---|---|---|---|
| 8,313,379 | B2 * | 11/2012 | Ikeda | A63F 13/98 345/158 |
| 11,547,932 | B2 | 1/2023 | Lea | |
| 2006/0025214 | A1 * | 2/2006 | Smith | A63F 13/12 463/30 |
| 2012/0309542 | A1 * | 12/2012 | Nogami | H04N 21/41265 463/42 |
| 2015/0121230 | A1 | 4/2015 | Kulavik et al. | |
| 2018/0001209 | A1 * | 1/2018 | Verfaillie | A63F 13/35 |
| 2018/0117477 | A1 * | 5/2018 | Miura | H04L 51/18 |
| 2018/0227761 | A1 | 8/2018 | Weigand et al. | |
| 2018/0361235 | A1 * | 12/2018 | Hunter | H04L 67/5681 |
| 2021/0252399 | A1 | 8/2021 | Juenger et al. | |

OTHER PUBLICATIONS

Int'l Search Report and Written Opinion Appln No. PCT/US2022/043757 mailed Jan. 6, 2023.

* cited by examiner

*Primary Examiner* — David L Lewis
*Assistant Examiner* — Eric M Thomas
(74) *Attorney, Agent, or Firm* — McAndrews, Held & Malloy, Ltd.

(57) ABSTRACT

This disclosure describes a system that allows a user to communicate via social networking from a game controller. These social networking notifications may be displayed on a screen of the game controller. In addition to the game controller, the disclosed system may comprise an app, on a device external from the game controller, that is also able to display the social networking notifications.

17 Claims, 3 Drawing Sheets

VIDEO GAME CONTROLLER WITH SOCIAL NETWORKING

BACKGROUND

Limitations and disadvantages of conventional game controllers will become apparent to one of skill in the art, through comparison of such game controllers with some aspects of the present system set forth in the remainder of this disclosure with reference to the drawings.

BRIEF SUMMARY

A video game controller with social networking is provided substantially as illustrated by and/or described in connection with at least one of the figures, as set forth more completely in the claims.

DETAILED DESCRIPTION

This disclosure describes a game controller system that allows a user to access and adapt the features of a game controller as well as secondary actions associated with the gaming experience. The disclosed game controller system may comprise an application ("app"), on a device external from the game controller, that is operable to adjust settings and profiles of the game controller. These settings and profiles are viewable, by the user, from a screen on the game controller. The app may be a PC app, a windows app, or a Mac app. The app may also be a mobile app for a smartphone and/or tablet.

Certain embodiments of the disclosure may be found in a game controller with a user interface. In accordance with various embodiments of the disclosure, a device, such as a smartphone or tablet, may control settings and profiles, used by the game controller, that may be displayed on the user interface of the game controller. The device may adapt and adjust the settings and profiles even while the game controller is being actively used during a game. The device may communicate with the game controller wirelessly via Bluetooth, Wi-Fi, or any other wireless protocol. The game controller, disclosed herein, is not platform-specific and may communicate with a game console wired or wirelessly via Bluetooth, Wi-Fi, or any other wireless protocol.

The disclosed game controller system offers an integrated social networking hub. In addition, the disclosed game controller system also delivers innovative applications of technology that improve a user's experience.

Figure 1:
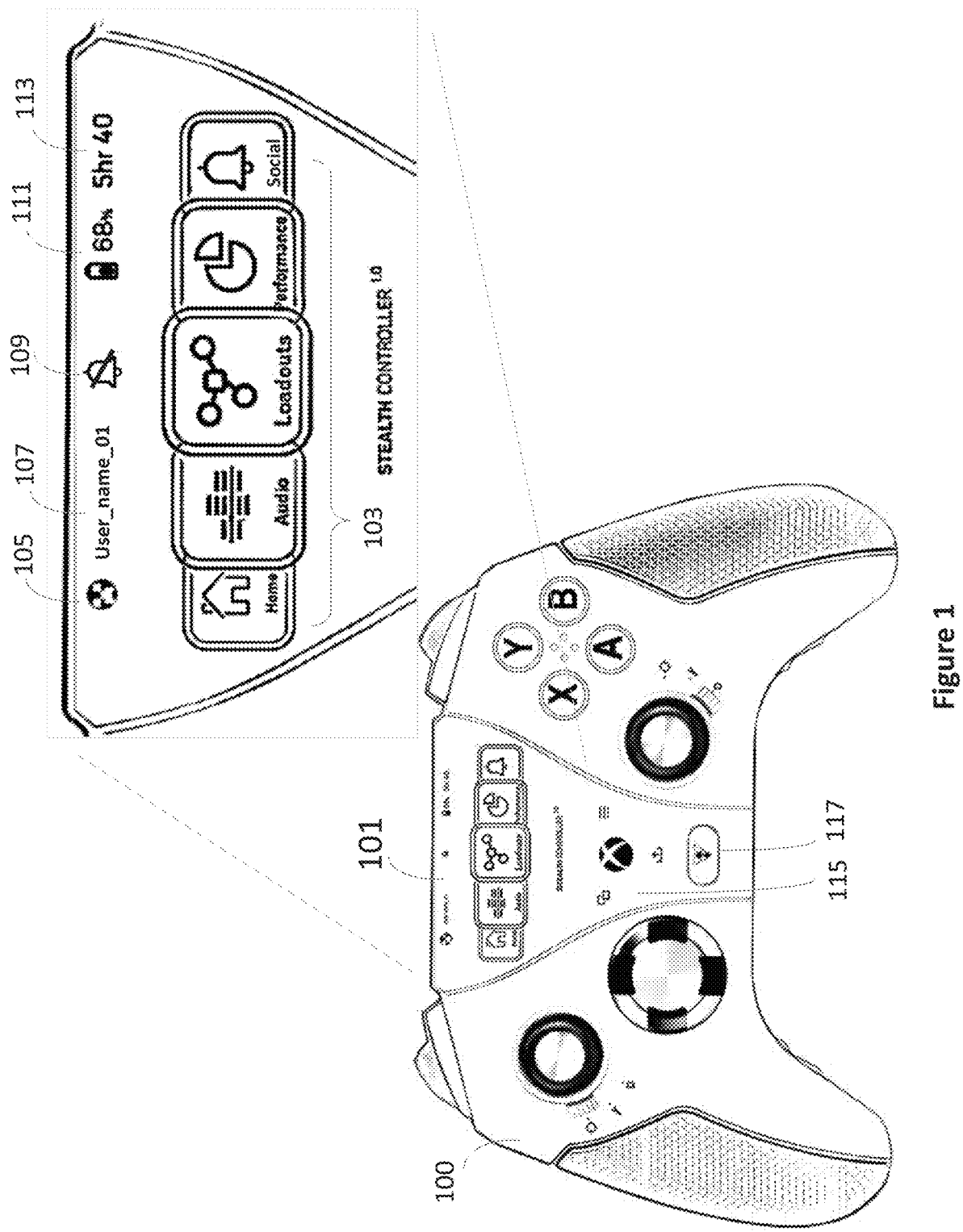
FIG. 1 illustrates an exemplary video game controller with a graphical user interface displaying a menu in accordance with aspects of this disclosure.

FIG. 1 illustrates an exemplary video game controller 100 with a graphical user interface 101 displaying a menu. The game controller 100 is configured to operate a video game and also comprises a memory, a processor and a screen 101. The video game may comprise a PC game, a console game, a mobile game a Mac game or any other electronic game. The memory in the game controller 100 is configured to store data associated with the game controller 100. The processor in the game controller 100 is configured to access the memory. The screen 101 is operably coupled to the processor and is configured to display the data to the user of the game controller 100. The game controller 100 may comprise a wireless interface that is operable to communicate directly with a video game console. A dongle may be plugged into the video game console to allow the wireless communication. For example, a USB connection on the video game console may be adapted, via the dongle, to communicate with the game controller 100 via Bluetooth, Wi-Fi or any other wireless protocol.

The screen 101 is integrated into the game controller 100. The screen 101 may comprise a graphical user interface and a touch screen. For example, the screen 101 may comprise a capacitive touch display. The screen 101 may also comprise a high resolution display with deep blacks and rich color. The screen 101 may be covered by a tempered glass that may be configured with smooth 3D curves on the edges.

The screen 101 may display programmable settings, profiles, and/or metrics. What and how elements are displayed is adjustable, via the processor, even while the game controller 100 is in use. The display on the screen 101 may provide a quick, in-game access to the settings, profiles, and/or metrics. The game controller 100 may comprises one or more buttons 117 for controlling what is displayed on the screen 101. The game controller 100 may also comprises one or more backlit controls 115.

The graphical user interface 101 in FIG. 1 illustrates a menu of core features 103, a user icon 105, user name 107, a communication setting 109, a battery charge level 111, and an estimate time 113 until a battery must be recharged. This menu is a user-customizable dashboard that can be designed and redesigned by a user as desired for easy access to most frequently used features and to provide an overview of the controller 100 status. For example, an intuitive user interface may allow a user to quickly and easily change settings as desired.

Because the screen 101 is operable to display a customizable, user interface, the user interface may be configured to indicate primary features of the game controller and secondary features/actions of the game experience. The menu carousel 103 may be selectable by touch or the core feature set hubs may be accessed using the button 117. As illustrated in FIG. 1, the core hubs may comprise Home, Loadouts, Audio, Performance and Social. The Social Networking hub may be use to maintain audio and text communication directly from the game controller 100.

The user icon 105 and user name 107 may be selectable according to who is using the game controller 100 at any given time. The communication setting 109 may toggle between allowing and blocking communication via social media and other communication devices. The processor in the game controller 100 may be operable to control communication from an external device.

The game controller 100 may comprise a rechargeable battery. The battery charge level 111 and the estimate time 113 until a battery must be recharged are useful for indicating when a battery needs to be swapped or recharged. Recharging may be performed via a cable or a dedicated cradle.

Figure 2:
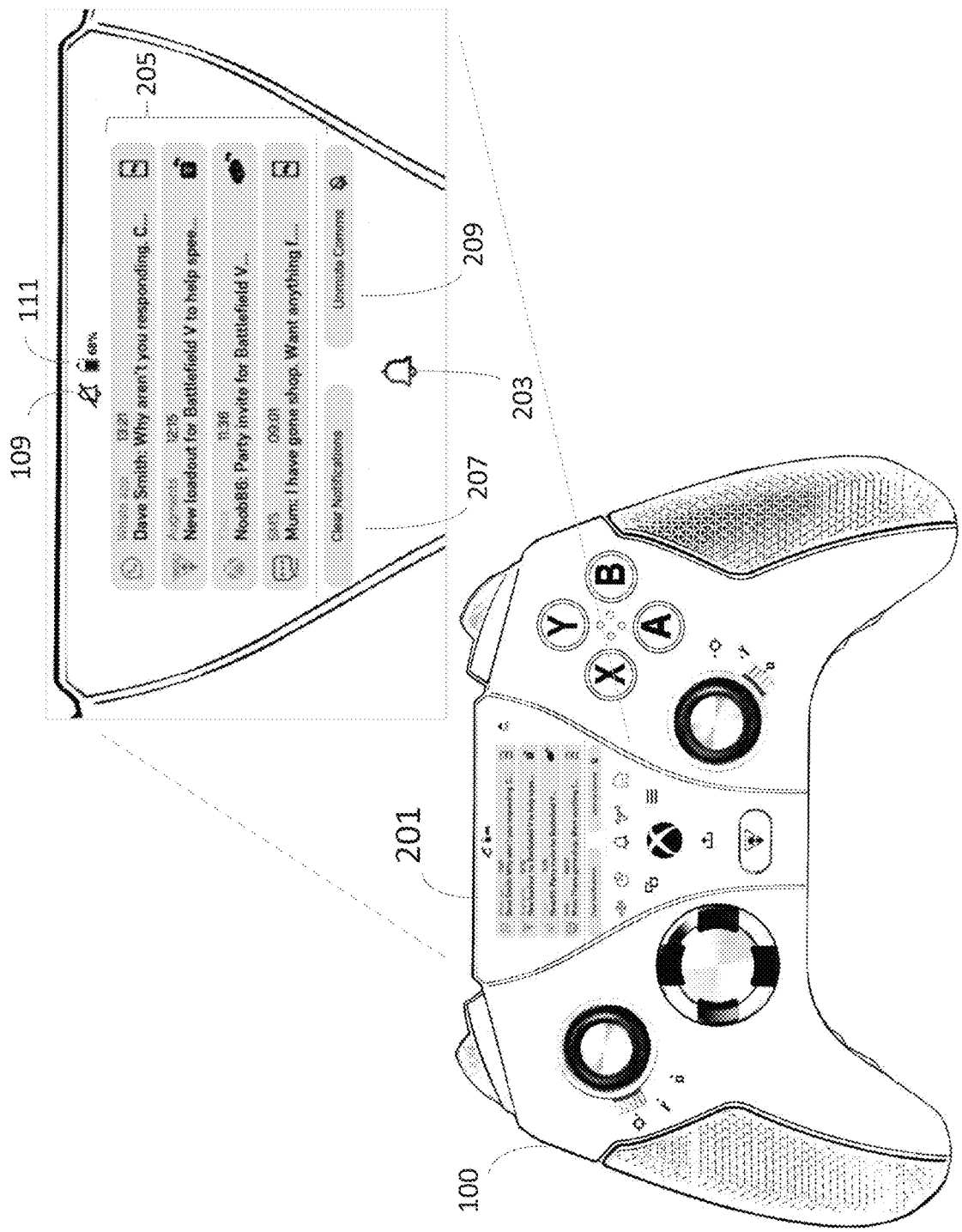
FIG. 2 illustrates an exemplary video game controller with a graphical user interface displaying a social networking screen in accordance with aspects of this disclosure.

FIG. 2 illustrates an exemplary video game controller 100 with a graphical user interface displaying a social networking screen 201, which may be identified via the social networking icon 203.

The social networking screen 201 comprises customized screen elements for displaying notifications 205. The social networking screen 201 may allow access to all of a user's important information in one feed. Alerts may be routed to the controller 100 for the user to review and respond. A portion of several notifications 205 may be shown together.

The screen 201 may be touch sensitive, thereby enabling a user to respond to a message of one or more messages by touching the screen of the game controller. For example, if a notification comprises an invitation, a user can decide how to deal with the invitation—be social and join a squad or stick to solo gaming.

A particular notification feed may be touched to show the full message on the controller screen 201. The layout of controller screen 201 may be configured to suit the user's requirements. When an alert appears (even when a user is viewing another screen configuration), the user may press a location on the screen or another particular button to jump to the alert as part of the social hub screen 201.

Notifications 205 may be received and sent via SMS text, WhatsApp™, or any other application platform for communication.

In addition to the displaying notifications 205, a processor in the game controller 100 may also communicate audio messages and alerts to a headset or from a microphone (e.g., coupled to the headset).

The social networking screen 201 may allow a user to clear 207 communications, notifications and alerts. The social networking screen 201 may also allow a user to mute or unmute 209 future communications, notifications and alerts.

The social networking screen 201 may also comprise the communication setting indicator 109 and the battery charge level indicator 111 as described with reference to the exemplary display 101 in FIG. 1.

Social networking from the game controller 100 may be performed via edge and/or cloud computing. The layout of social networking screen 201 may be designed, controlled and revealed via an application that runs on the game controller 100 and/or via a mobile application (app) that runs on an external device.

Figure 3:
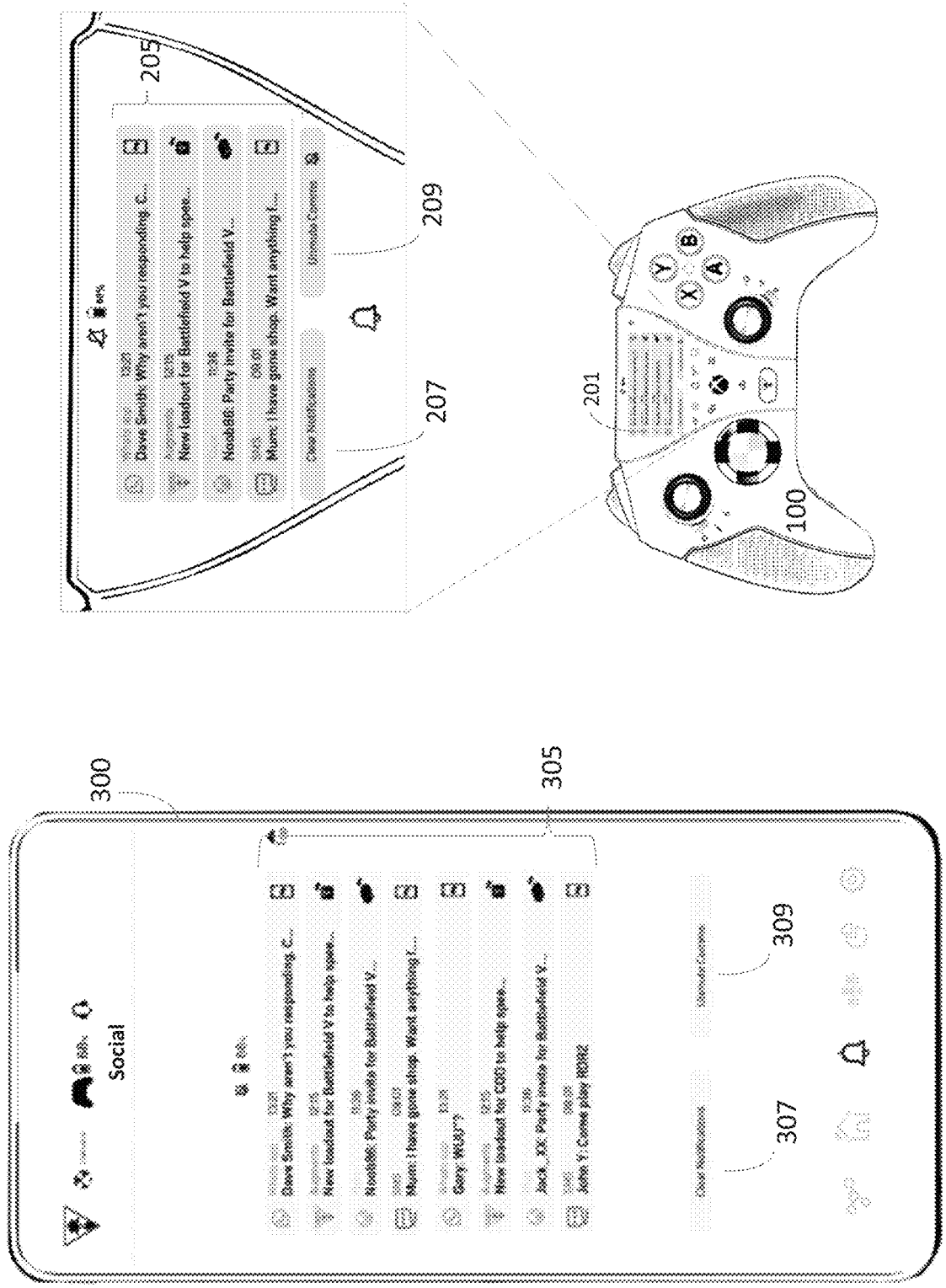
FIG. 3 illustrates an exemplary video game controller and an associated app running on a mobile device in accordance with aspects of this disclosure.

FIG. 3 illustrates an exemplary video game controller 100 and an associated app 300 running on a mobile device. As illustrated, the app 300 on the mobile device is used to configure and dynamically display and control the social networking screen 201 on the game controller 100.

An app 300 may be configured to operate on a device external from the game controller 100. The app 300 is operable to adjust the feed used by the game controller 100 even while the game controller 100 is in use. The device may be, for example, a smartphone or a tablet. The game controller 100 may comprise a wireless interface that is operable to communicate directly with the device. For example, a particular screen layout design can be created on the companion app 300 and sent to onboard memory of the controller 100. The app 300 may also be enabled to access storage of a cloud service provider and be powered by the cloud. The app 300 may provide full access to the game controller 100 to customize and improve performance.

As illustrated, the app 300 may mirror the social networking screen 201. The elements of the app 300 may also provide additional details as desired by the user. The app may display notifications 305 that are also displayed 205 on the social networking screen 201. Likewise, the app 300 may allow a user to clear 307 communications, notifications and alerts and allow a user to mute or unmute 309 future communications, notifications and alerts.

Social networking accounts may be linked to the controller 100 via the companion app 300 and all alerts routed to the controller 100 may be reviewed and responded to either through the app 300 or the social networking screen 201.

A non-transitory computer-readable medium storing a program may be operated by a processor on the external device via the app 300 and/or by a processor on the controller 100. The program may operably couple (e.g., via wireless communication such as Bluetooth, Wi-Fi and/or cellular protocols) a game controller 100 to a social network. Once operably coupled, the program may communicate one or more messages over the social network via the processor, thereby allowing one or more messages to be displayed on a screen 201 of the game controller 100.

While the present system has been described with reference to certain implementations, it will be understood by those skilled in the art that various changes may be made and equivalents may be substituted without departing from the scope of the present system. In addition, many modifications may be made to adapt a particular situation or material to the teachings of the present disclosure without departing from its scope. Therefore, it is intended that the present method and/or system not be limited to the particular implementations disclosed, but that the present system will include all implementations falling within the scope of the appended claims.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a game controller configured to operate a video game console, the game controller comprising:
      a processor configured to communicate one or more messages via a social network, wherein the processor is operable to communicate an audio message to a headset; and
      a screen, operably coupled to the processor, configured to display the one or more messages to a user of the game controller.

2. The system of claim 1, wherein the system comprises an application ("app") configured to operate on a device external from the game controller, wherein the app is operable to route the one or more messages between the game controller and the social network.

3. The system of claim 2, wherein the app is a mobile app and the device is a smartphone.

4. The system of claim 2, wherein the app is a mobile app and the device is a tablet.

5. The system of claim 1, wherein new messages are displayed while the game controller is in use.

6. The system of claim 1, wherein the screen is touch sensitive, and wherein the user is operable to respond to a message of the one or more messages by touching the screen of the game controller.

7. A method comprising:
   operably coupling a game controller to a video game console and a social network;
   communicating one or more messages over the social network via a processor of the game controller;
   displaying a message of the one or more messages on a screen of the game controller; and
   communicating an audio message from the game controller to a headset.

8. The method of claim 7, wherein the method comprises:
   routing the one or more messages between the game controller and the social network via an application ("app") operating on a device external from the game controller.

9. The method of claim 8, wherein the app is a mobile app and the device is a smartphone.

10. The method of claim 8, wherein the app is a mobile app and the device is a tablet.

11. The method of claim 7, wherein the method comprises:
    updating the screen with new messages while the game controller is in use.

12. The method of claim 7, wherein the method comprises:
    responding to a message of the one or more messages by touching the screen of the game controller.

13. A non-transitory computer-readable medium storing a program, wherein when operated by a processor, the program configures a method comprising:
    operably coupling a game controller to a video game console and a social network;
    communicating one or more messages over the social network via the processor of the game controller;
    displaying a message of the one or more messages on a screen of the game controller; and
    communicating an audio message from the game controller to a headset.

14. The non-transitory computer-readable medium of claim 13, wherein the game controller comprises the non-transitory computer-readable medium and the processor.

15. The non-transitory computer-readable medium of claim 13, wherein a mobile device, external to the game controller, comprises the non-transitory computer-readable medium and the processor.

16. The non-transitory computer-readable medium of claim 15, wherein the mobile device is one of a smartphone and a tablet.

17. The non-transitory computer-readable medium of claim 13, wherein the method comprises responding to a message of the one or more messages by touching the screen of the game controller.

* * * * *